2 Sheets--Sheet 1.

F. L. POPE.

Electric Signaling Apparatus for Railways.

No. 6,578. Reissued Aug. 3, 1875.

Witnesses:
J. E. Foote
A. McNorris

Inventor:
Frank L. Pope
By his Atty.
James L. Norris

2 Sheets--Sheet 2.
F. L. POPE.
Electric Signaling Apparatus for Railways.
No. 6,578. Reissued Aug. 3, 1875.
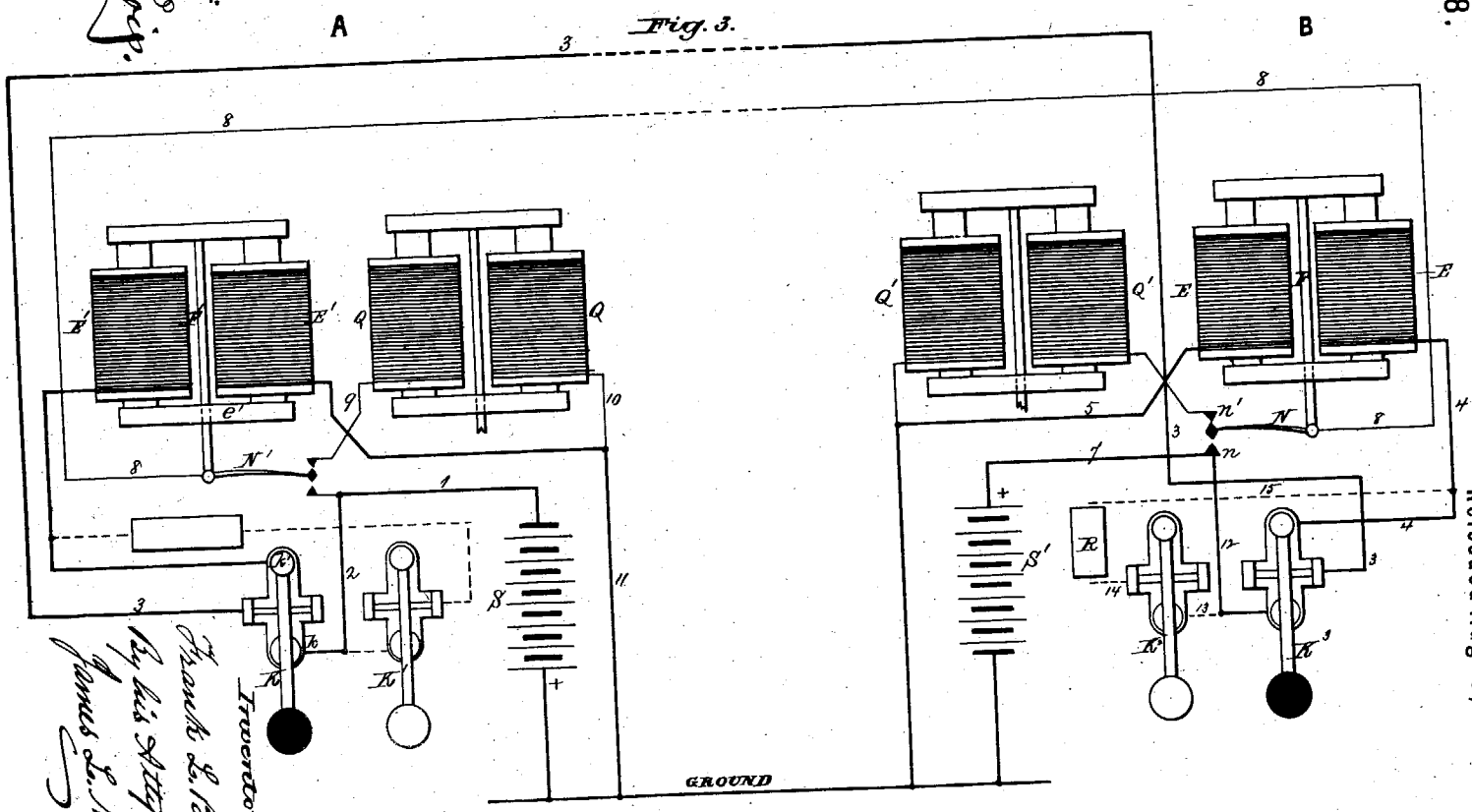
Witnesses:
Jo. L. Coombs
A. H. Norris.
Inventor:
Frank L. Pope.
By his Atty.
James L. Norris

UNITED STATES PATENT OFFICE.

FRANK L. POPE, OF ELIZABETH, ASSIGNOR TO HIMSELF, JAMES N. ASHLEY, OF GREENVILLE, NEW JERSEY, STEPHEN C. HENDRICKSON, OF BROOKLYN, NEW YORK, AND JAMES D. LINCOLN, OF GREENVILLE, NEW JERSEY.

IMPROVEMENT IN ELECTRIC SIGNALING APPARATUS FOR RAILWAYS.

Specification forming part of Letters Patent No. 130,941, dated August 27, 1872; reissue No. 6,578, dated August 3, 1875; application filed July 23, 1875.

DIVISION A.

*To all whom it may concern:*

Be it known that I, FRANK L. POPE, of Elizabeth, in the county of Union and State of New Jersey, have invented certain new and useful Improvements in Electric Signaling Apparatus for Railroads; and I do hereby declare that the following is a full, clear, and exact description thereof, reference being had to the accompanying drawing, which forms part of this specification.

My invention consists, first, in the combination, with an electro-magnet, of a signaling device so arranged as to exhibit the signals in duplicate, and with a small expenditure of power; secondly, in the combination, with a signaling apparatus, of an electro-magnet so constructed as to be actuated wholly or partially by axial magnetism, by means of which the effective length of stroke is materially increased; thirdly, in a method of utilizing the residual magnetism remaining in an electro-magnet after the exciting current has been interrupted, for retaining or continuing the signaling apparatus in position or action until the said residual magnetism is removed by a demagnetizing current of opposite polarity; fourthly, in an arrangement of electrical connections between two stations, by which the signal, after having been set by an operator at one station, can only be released or taken off by an operator at another station.

Figure 1:
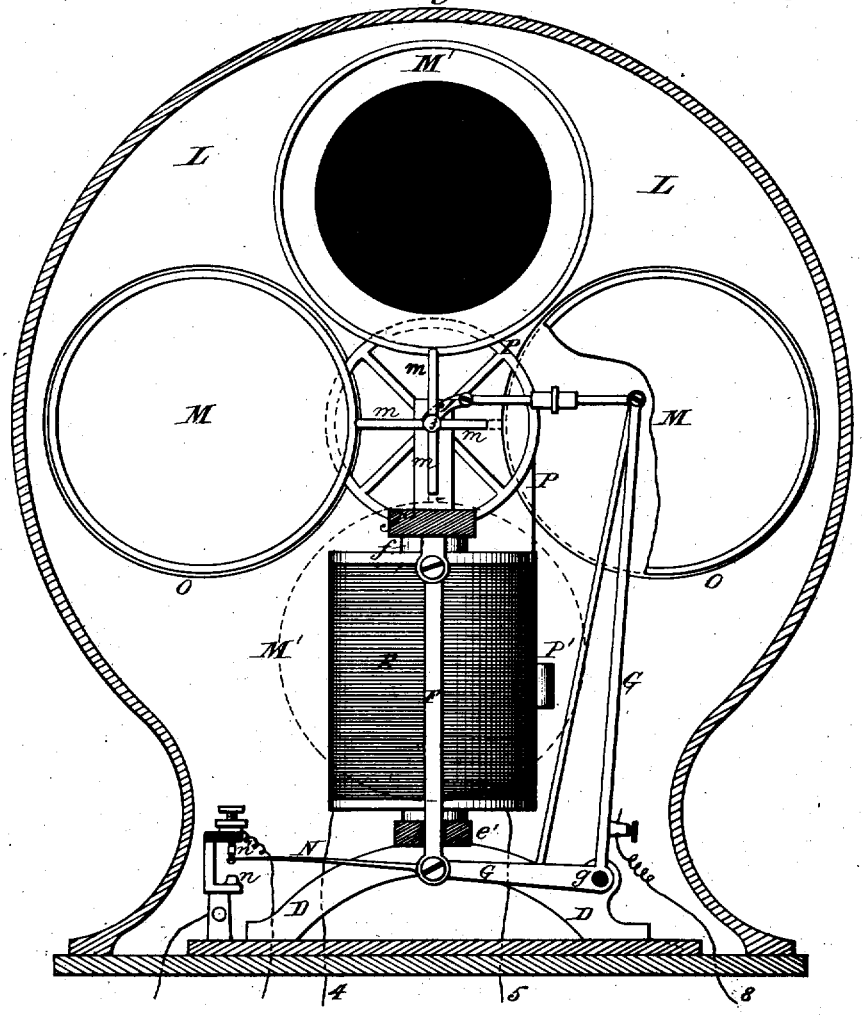
Figure 2:
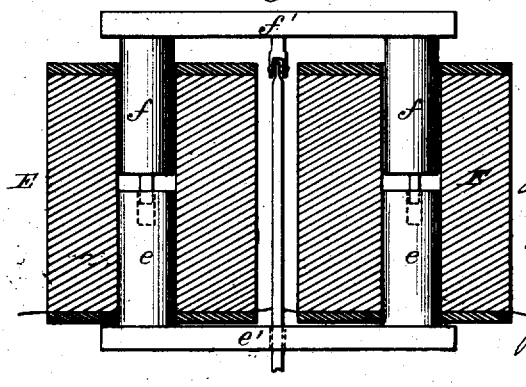

In the accompanying drawing, Figure 1 is an elevation of the signal-box and signal mechanism, the box and a portion of the apparatus being shown in section. Fig. 2 is a detached sectional view, showing the construction of the electro-magnet. Fig. 3 is a diagram, showing the arrangement of the electrical connections and the manner of operating the signals.

In Figs. 1 and 2, E E designate the helices of the electro-magnet which moves the signal apparatus. The soft-iron cores *e e* are of the usual cylindrical form, and are connected together by the soft-iron yoke *e'*, which is securely fastened in any suitable manner to the frame or support D D. The cores *e e* extend about half the length of the helices E E, and within them, as shown in Fig. 2. A second yoke, *f'*, also provided with cylindrical cores *f f*, which are movable longitudinally within the helices E E, constitutes the armature; and this armature is supported by a vertical rod, F, pivoted to an angular lever, G G, which turns upon an arbor at *g*, and the opposite extremity of which is pivoted to the pitman-rod H of a crank, J. The crank J is secured to an arbor or shaft, *j*, which is provided with suitable bearings. The signal is composed of four circular disks or targets, M M M' M', constructed of some thin and light material, such, for example, as paper or oiled silk stretched upon hoops of any suitable diameter. These disks should be of such size that, when used as railroad-signals, for example, they may be plainly visible to an engineer at a distance of several hundred yards. By constructing the disks of some semi-transparent material they may be illuminated at night by lamps placed directly behind them. These disks or targets are mounted upon radial arms *m m m m*, projecting from the arbor or shaft *j*. The alternating disks are of contrasting colors; for example, M and M may be white, while M' M' may be black, as represented in the drawing, or of any other suitable color. The signal is shown as inclosed in an opaque box, L, provided with two circular openings, O O, which permit the white disks M M to be seen from the exterior when the apparatus is in its normal position.

It will be readily understood that if the arbor or shaft *j* be moved the distance of one-fourth of a revolution the colored disks M' M' will be brought in front of the opening O O and the white disks M M will be concealed, while a reversal of this movement will cause the white disks to be again displayed and the colored disks concealed.

I will here remark that two disks or targets only—each of a different color—may be employed, instead of four; but in this case it would be proper to counterbalance such disks by a weight or weights, or otherwise.

It is generally preferable, however, to exhibit a double signal, as it is more distinctly visible at a distance, especially when illuminated at night.

When a current of electricity is sent through the helices E E, the axial magnetic force developed thereby tends to draw the cores *f f* into the helices, while at the same time both sets of cores (*f f* and *e e*) become powerfully magnetized, and their mutual attraction acts, in conjunction with the first-named force, to bring them into contact with each other. The employment of the force of axial magnetism in this manner is found to materially increase the effective length of stroke in the apparatus. The movement of the cores *f f* is transmitted, through the vertical rod F, angular lever G, and pitman H, to the crank J, which is so adjusted that the arbor-shaft *j* will be moved thereby through the distance of one-fourth of a revolution, and the colored disks or targets M′ and M′ will then be exhibited through the openings O O, instead of the white disks M and M, shown in the drawing. A pulley, P, provided with a cord, *p*, and a weight, *p′*, is also fixed upon the shaft *j*. The weight *p′* is sufficiently heavy to cause the apparatus to return to its normal position whenever the attraction between *e e* and *f f* ceases; but, inasmuch as these cores are permitted to come into absolute contact with each other, the residual magnetism, which, by a well-known law of magnetic action, always remains in the soft iron under these conditions, after the exciting current has ceased, prevents them from being separated by the action of the weight *p′*. If, now, a somewhat weaker electric current of opposite polarity be sent through the helices E E, the residual magnetism will be neutralized, and the attraction between *e e* and *f f* entirely destroyed, and the signal will at once return to its normal position by the action of the weight *p′* acting upon the pulley P.

Thus it will be understood that an electric current sent through the helices E E in one direction will cause a colored signal to be shown through the openings O O, which will remain in position after the said current has ceased, and until a current of opposite polarity is sent through the said helices, when a white signal will be again shown.

I wish it to be understood that I do not confine myself to the particular mode of constructing an electro-magnet as shown in Fig. 2. The same result may be produced by the use of an electro-magnet of the ordinary form, in which the cores *e e* extend entirely through the helices E E, and their attraction is exerted upon a simple armature, *f′*, which, if necessary, can be guided in any suitable manner, so as to come directly in contact with the ends of both cores *e e*; and I will further remark that the movable cores *f f* (shown in Fig. 2) may be extended nearly or quite through the helices E E, and the cores *e e* and yoke *e′* may be dispensed with, in which case the movement of the cores *f f* and yoke *f′* will be effected solely by axial magnetism.

A and B, Fig. 3, are supposed to represent two stations situated at the opposite ends of a bridge, tunnel, or any section of single track upon the line of a railroad. Each station is provided with a semaphoric signal, constructed and arranged as hereinbefore described, as well as a tell-tale or repeating signal, a battery, and two finger-keys of any suitable construction.

The manner in which the apparatus is operated is as follows: We will assume that a train is about to enter at A upon the section of track between A and B. The operator at A depresses the black key K, which closes the circuit at *k*. An electrical current from the negative or — pole of the battery S (its positive or + pole being permanently in connection with the ground) will pass through the wires 1 and 2 to the key K; thence over the line-wire 3 to station B; thence through the rear contact of key $K^3$ and wire 4 to the helices E E of the semaphoric signal-operating magnet, and thence to the ground by the wires 5 and 6. The passage of this current through E E will cause a black or other colored signal to be displayed at B, as hereinbefore explained, thereby warning any train approaching B in the opposite direction that the right of way is held by the train going from A toward B.

In order that the operator at A may know whether the signal at B is properly displayed, the latter is made to work a repeating-signal or tell-tale at A. This is accomplished as follows: N, Figs. 1 and 3, is a flexible metallic arm attached to the lever G of the signal, its extremity being placed between two metallic stops, *n* and *n′*, and so adjusted that when the apparatus is in its normal position, and exhibiting the white signal, it will be in contact with the stop *n′*; but when the apparatus is in position to exhibit the colored signal the said arm will be brought in contact with the stop *n*. It will, therefore, be understood that when the signal at B has been set by the operator at A, as hereinbefore explained, the arm N will be brought in contact with the stop *n*. This contact will close the circuit and cause a current to pass from the battery S′, through wire 7, arm N, line-wire 8, arm N′, and wire 9, to the helices Q Q at station A, and thence, by wires 10 and 11, to the ground.

The helices Q Q may be employed to operate any suitable form of tell-tale, repeating-signal, or alarm-bell, the particular arrangement adopted being immaterial, as the object of the device is merely to inform the operator at A that the semaphoric signal at B is in the desired position.

As soon as the operator at A has received the return signal from B he allows the train to proceed on its way to B. The signal at B is held in position, after the operator at A breaks the circuit at the key K, by the action of the residual magnetism, as hereinbefore explained. When the train reaches B the operator at B depresses the white key $K^2$. This causes a current to pass from the positive pole of the battery S′, through the wires 7, 12, and 13, to the key $K^2$, and thence, through the wires 14, 15, and 4, to the semaphoric helices E E, and thence, by the wires 5 and 6, to the earth. This current, being of a polarity opposite to that by which the magnet was originally charged, neutralizes the residual magnetism, and permits the signal to resume its normal position, which latter operation breaks the circuit between N and *n*, and thereby releases the repeating-signal connected with Q Q, and notifies the operator at A that the train has arrived at B.

In case a train is moving from B toward A the operation is precisely the same, but in a reverse direction. The operator at B depresses $K^3$, and sends a current through the helices E′ E′ of the semaphoric signal-operating magnet at A, its movements being indicated by the repeating-signal connected with Q′ Q′.

It will be observed that the signal at B, and consequently the tell-tale or repeating-signal at A, having been once set by the operator at A, cannot be released or reversed by himself, but must remain in position until taken off by the operator at B upon the arrival of the train at that station, and vice versa. This arrangement prevents the possibility of any mistake or misunderstanding between the two stations in regard to the position of the signal.

It is necessary that the current of reverse polarity for neutralizing the permanent magnetism in the semaphoric magnets should be considerably weaker than the primary circuit. This result is accomplished by inserting a rheostat, R, into the circuit between the key $K^2$ and the helices E E, by the aid of which the strength of the current may be modified or regulated at pleasure. The same result may be accomplished by using a smaller separate battery of suitable power, or by including only a small portion of the battery S′ in the reversing-circuit; or the battery may be dispensed with, and the demagnetizing current may be derived from a magnetic electric apparatus of any well-known and suitable construction.

The force of the residual magnetism employed for the purpose of holding or retaining the signal in position may be greatly increased by making the yokes *e′* and *f′* of hardened steel, or by partially hardening the cores *e e* and *f f*; and it will in most cases be found preferable to construct the magnet in this way.

In case a signaling apparatus is so situated as to be exposed to excessive vibration, such, for instance, as that caused by the rapid passage of trains, so that the residual magnetism remaining in the cores of the electro-magnet after the circuit is broken is insufficient to retain the apparatus in position with certainty, a weak current may be made to circulate around the cores *e e* after the primary current has ceased, and in the same direction.

This current may be derived from the same battery as the primary current, or from a separate battery, as may be found most convenient. By this means the force of the residual magnetism may be increased to any desired extent.

A bell-signal may be used for communicating between the stations A and B, using the wire 3 and a weaker current, which, though strong enough to operate a magnet for striking a bell, will not be sufficient to affect the semaphoric magnets. This current may be derived from a separate battery, or from the main battery, or a portion thereof, and weakened by being made to pass through a rheostat. This arrangement, however, forms no necessary part of my invention, and therefore need not be further described.

When it is desired to operate the signal through a considerable length of line, I employ a relay-magnet of any suitable construction in place of the helices E E and their appurtenances. This relay is caused, in a manner well understood, to close the circuit of a local battery actuating a magnet which moves the signal. The armature of the said relay is held in position after the circuit is broken by means of the residual magnetism, as hereinbefore explained, and thus the local circuit remains closed, and the signal displayed, until a demagnetizing current is sent through the helices of the relay.

In case it is found desirable or necessary to employ a bell or other alarm operated by electro-magnetism or mechanical power in any suitable manner, in lieu of or in conjunction with a semaphoric signal, I employ a relay constructed in the manner last described, for the purpose of actuating or controlling the said bell or alarm through the agency of a local circuit.

I make no claim to the method herein shown by which the electro-magnet that actuates a semaphoric signal at a distant station is made to close another circuit, and actuate a secondary signal situated at or near the point from which the primary signal is operated, as substantially the same arrangement is set forth in the English patent of W. H. Preece No. 77, January 10, 1862.

What I claim as my invention, and desire to secure by Letters Patent, is—

1. A semaphoric signal constructed with disks or targets of alternate contrasting colors, in combination with an electro-magnet, substantially as specified.

2. An electro-magnet actuated partially or wholly by axial magnetism, in combination with a semaphoric signal, substantially as and for the purpose described.

3. An electro-magnet having an armature so arranged as to be held in contact with its poles by residual magnetism until released by an opposing or demagnetizing current emanating from any suitable apparatus for generating electricity, in combination with a semaphoric signaling apparatus or an alarm, substantially as specified.

4. The combination of a semaphoric signal operated by electro-magnetism, and a secondary signal actuated or controlled by said semaphoric signal, with a reversing or releasing apparatus so arranged that when the said signals have been set by an operator at one point or station they can only be reversed or released by an operator at another point or station, substantially as herein specified.

In testimony that I claim the foregoing I have hereunto set my hand in presence of the subscribing witnesses.

FRANK L. POPE.

Witnesses:
JAMES D. LINCOLN,
J. N. ASHLEY.